United States Patent
Sasaki et al.

(10) Patent No.: US 10,625,507 B2
(45) Date of Patent: Apr. 21, 2020

(54) TRANSFER METHOD, MANUFACTURING METHOD OF LIQUID EJECTION HEAD, AND FRAME JIG

(71) Applicant: CANON KABUSHIKI KAISHA, Tokyo (JP)

(72) Inventors: Koji Sasaki, Nagareyama (JP); Shingo Nagata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 16/046,169

(22) Filed: Jul. 26, 2018

(65) Prior Publication Data
US 2019/0039375 A1  Feb. 7, 2019

(30) Foreign Application Priority Data
Aug. 2, 2017 (JP) .................. 2017-150004

(51) Int. Cl.
*B41J 2/16* (2006.01)
*B32B 43/00* (2006.01)
*B32B 37/00* (2006.01)

(52) U.S. Cl.
CPC .......... *B41J 2/1623* (2013.01); *B32B 37/025* (2013.01); *B32B 43/006* (2013.01); *B41J 2/1603* (2013.01); *B41J 2/1632* (2013.01); *B41J 2/1645* (2013.01); *B41J 2202/22* (2013.01)

(58) Field of Classification Search
USPC ........ 156/230, 231, 232, 234, 240, 247, 249
See application file for complete search history.

(56) References Cited

U.S. PATENT DOCUMENTS 8,083,324 B2  12/2011  Kwon et al.
2003/0029553 A1*  2/2003  Toyoda ................. B29C 31/006
                                                          156/230

FOREIGN PATENT DOCUMENTS

JP           2005-246228 A          9/2005

* cited by examiner

*Primary Examiner* — Sing P Chan
(74) *Attorney, Agent, or Firm* — Venable LLP

(57) ABSTRACT

There is provided a transfer method for transferring a member formed on a film held on a frame jig to an object including: attaching the member formed on the film to the object in a first direction; and delaminating the film from the object in a second direction intersecting with the first direction, wherein a rigidity of the frame jig in the first direction is higher than that of the frame jig in the second direction.

12 Claims, 4 Drawing Sheets

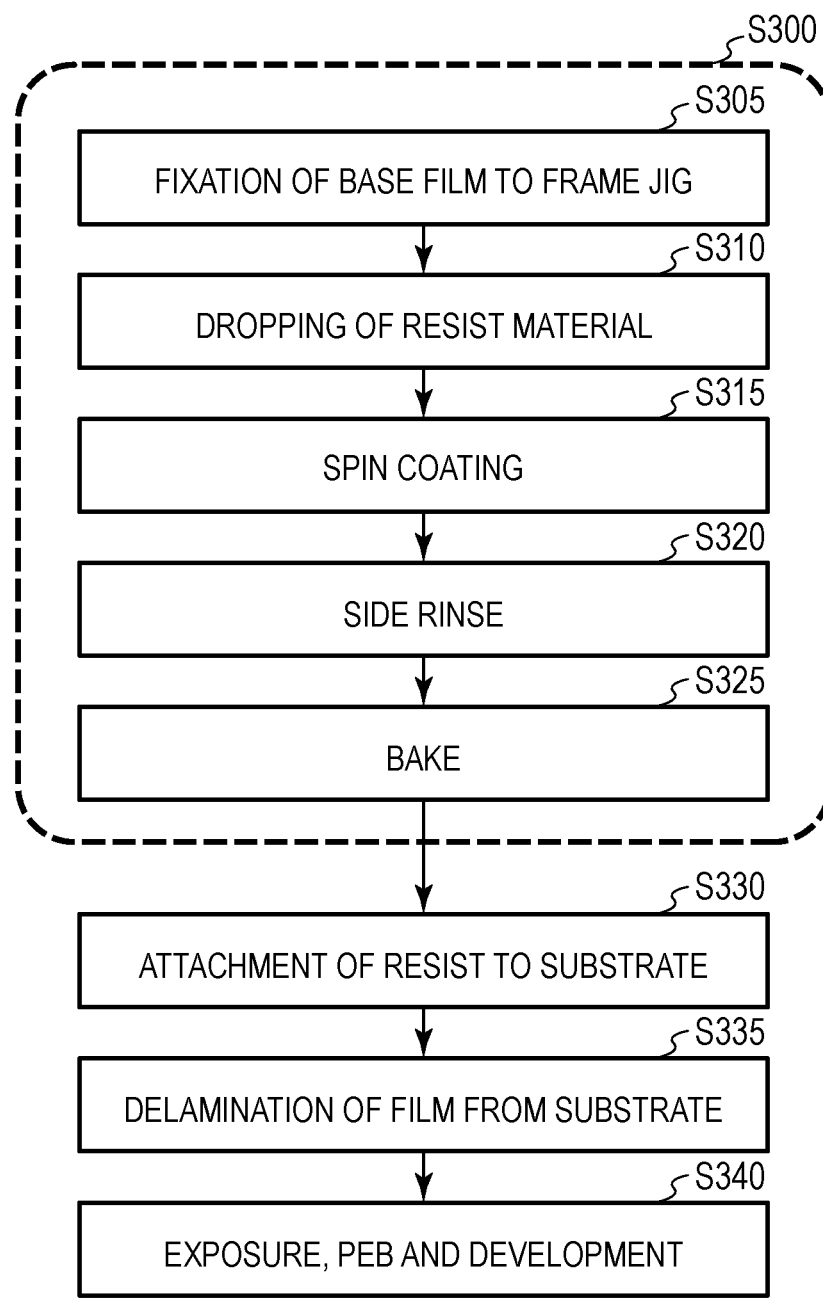

TRANSFER METHOD, MANUFACTURING METHOD OF LIQUID EJECTION HEAD, AND FRAME JIG

BACKGROUND OF THE INVENTION

Field of the Invention

The present invention relates to a transfer method, a manufacturing method of a liquid ejection head, and a frame jig.

Description of the Related Art

A recording element substrate is mounted in a liquid ejection head used in a liquid ejection apparatus of an ink jet recording apparatus or the like. The recording element substrate is manufactured by forming an ejection orifice using an ejection orifice forming member on a substrate corresponding to a base and cutting the substrate to form a chip.

A transfer method of a dry film resist to a substrate in which an ink supply port is formed as a through-hole is disclosed in U.S. Pat. No. 8,083,324. The dry film resist is a film shaped member in which a layer (resist layer) made of a resist material is formed on a base film. According to the transfer method of a dry film resist, a resist layer can be formed on a substrate having a through-hole to cover a base step of the substrate. Thereafter, it is possible to form a structure forming an ejection orifice by forming a channel layer by a method such as photolithography or the like and forming an orifice plate layer on the channel layer. A technology of forming a resist layer on a film by a spin coating method is disclosed in Japanese Patent Application Laid-Open No. 2005-246228. The spin coating method is a method of forming a thin film by centrifugal force by rotating a smooth substrate at a high speed.

In the case of applying a resist material on a film to manufacture a dry film and the case of transferring a manufactured dry film resist to a substrate, a frame-shape jig is used for fixing the film. FIGS. 1A to 1E are views illustrating a step of transferring a dry film resist to a substrate. As illustrated in FIG. 1A, a dry film resist (hereinafter, referred to as a dry film 22) using a frame 21 as a support is prepared. Further, as illustrated in FIG. 1A, the dry film 22 is attached to a substrate 24 using a pressure roller 23. Subsequently, as illustrated in FIGS. 1B and 1C, the dry film 22 is cut off at an outer peripheral portion of the substrate 24 using a cutter 25, and the unnecessary dry film (including the frame 21) is removed. Next, as illustrated in FIG. 1D, only the base film 26 is delaminated from the dry film 22 attached on the substrate 24. Then, as illustrated in FIG. 1E, a substrate on which a resist layer (resist film) 27 is formed can be obtained.

SUMMARY OF THE INVENTION

According to an exemplary embodiment of the present invention, there is provided a transfer method for transferring a member formed on a film held on a frame jig to an object, including: attaching the member formed on the film to the object in a first direction; and delaminating the film from the object in a second direction intersecting to the first direction, wherein a rigidity of the frame jig in the first direction is higher than that of the frame jig in the second direction.

Further features of the present invention will become apparent from the following description of exemplary embodiments with reference to the attached drawings.

BRIEF DESCRIPTION OF THE DRAWINGS

FIG. 3 is a flow chart including a transfer method of a dry film.

DESCRIPTION OF THE EMBODIMENTS

Figure 1A:
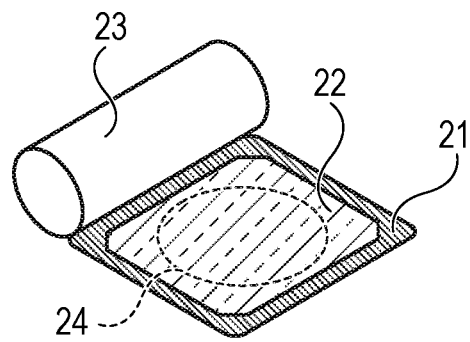
FIGS. 1A, 1B, 1C, 1D and 1E are views for explaining a transfer method according to the related art.

When a dry film attached to a substrate is separated at an outer peripheral portion of the substrate using a cutter, dust may be generated. Generation of the dust has an influence on dimensional accuracy or quality of an ejection orifice. For this reason, there is a need to add a step of removing the generated dust or to select a film that does not generate dust.

Therefore, an object of the present invention is to provide a transfer method capable of transferring a dry film to a substrate without separation of the dry film corresponding to a cause of generation of dust.

Hereinafter, exemplary embodiments of the present invention will be described with reference to the accompanying drawings. In addition, the following exemplary embodiments do not limit the present invention, and not all combinations of features described in the present embodiment are essential to the solution of the present invention. Further, the same components are denoted by the same reference numerals. In addition, relative arrangement, shapes and the like of components described in the exemplary embodiments are merely examples, and the scope of the present invention is not limited thereto. Further, numerical values in the following embodiments are merely examples, and the present invention is not limited thereto. Furthermore, the present invention is not limited to the exemplary embodiment, but further includes combinations of these, as well as those applied to other technical fields.

<<Exemplary Embodiment 1>>

Figure 2A:
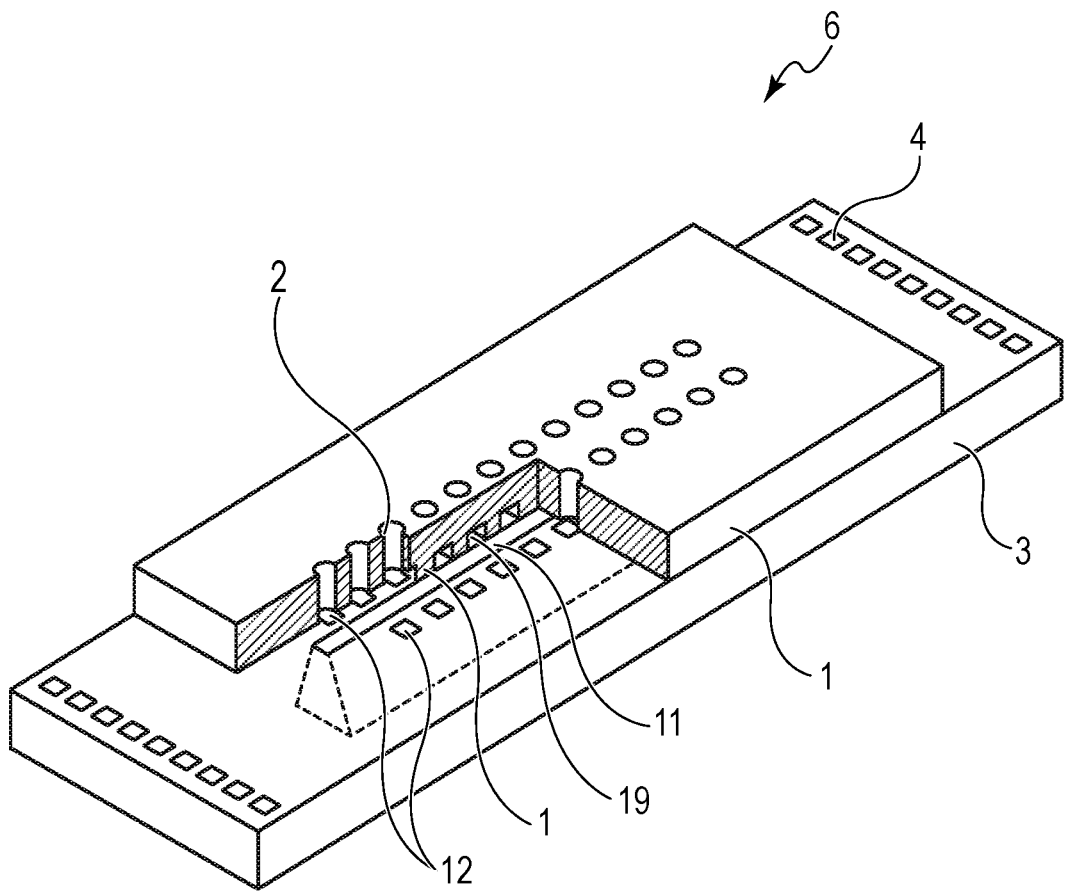
FIGS. 2A and 2B are views illustrating a configuration of a liquid ejection head.
Figure 2B:
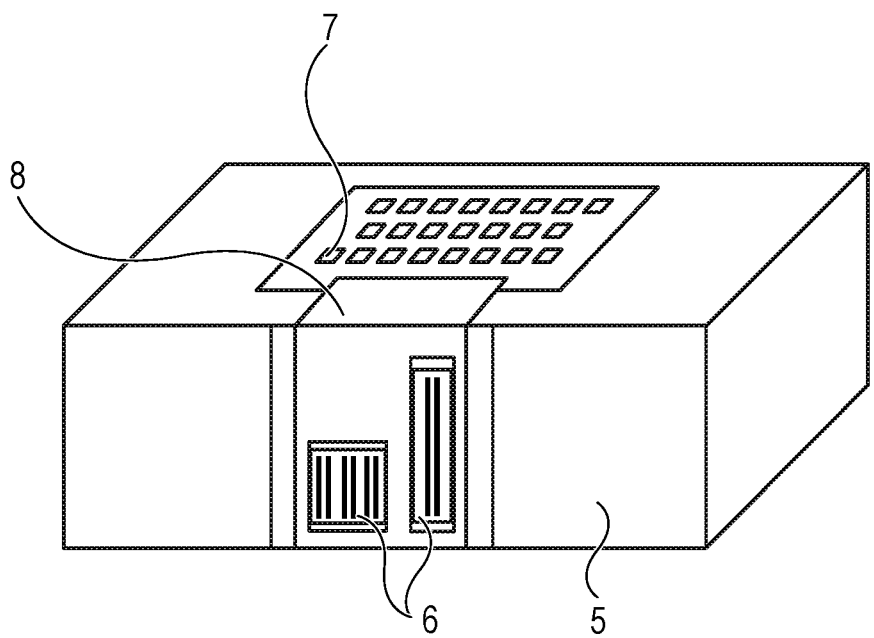

FIGS. 2A and 2B are views illustrating examples of a liquid ejection head 5 and a recording element substrate 6 used in a liquid ejection apparatus. A dry film described in the present exemplary embodiment is used as a material for manufacturing the recording element substrate 6.

FIG. 2A is a perspective view illustrating a general recording element substrate 6. The recording element substrate 6 is composed of a liquid ejection head substrate 3 provided with an energy-generating element 12 and an ejection orifice forming member 1 formed on the liquid ejection head substrate 3. The energy-generating element 12 is provided on the liquid ejection head substrate 3. The ejection orifice forming member 1 has a plurality of through-holes provided to penetrate through a faced portion facing a surface of the liquid ejection head substrate 3 provided with the energy-generating element 12. The ejection orifice forming member 1 as described above is made of a resin material, and the plurality of through-holes are collectively provided using a photolithography or etching technology.

The through-hole provided in the ejection orifice forming member 1 allows a first opening portion opened at a position facing the surface of the liquid ejection head substrate 3 provided with the energy-generating element 12 and a second opening portion provided at a liquid ejection side to be in communication with each other. The plurality of through-holes are used as ejection orifices 2 through which a liquid is ejected using energy generated by the energy-generating element 12, and are arranged at a predetermined pitch, thereby constituting an ejection orifice array.

As the energy-generating element 12 provided in the liquid ejection head substrate 3, an electrothermal conversion element (heater), a piezoelectric element (piezo element) or the like can be used. A plurality of energy-generating elements 12 are provided and arranged at a position facing the ejection orifice array, thereby constituting an element array. An ink supply port 11 provided to penetrate through the liquid ejection head substrate 3 to thereby supply the liquid to the energy-generating element 12 is provided at a position between the element arrays. Only one ink supply port 11 is present in the same liquid ejection head substrate 3 or a plurality of ink supply ports 11 are present in the same liquid ejection head substrate 3.

Further, the ejection orifice forming member 1 and the liquid ejection head substrate 3 come in contact with each other, such that a space therebetween becomes an ink flow path 19. A connection terminal 4 for supplying electricity to the energy-generating element 12 is present in the recording element substrate 6.

FIG. 2B illustrates a schematic configuration of the liquid ejection head 5. The recording element substrate 6 is adhered to the liquid ejection head 5, and electricity is supplied from a contact pad 7 to the recording element substrate 6 through a flexible wiring substrate 8, such that a liquid ejection operation is performed.

As illustrated in FIG. 2A, in the substrate mounted in the liquid ejection head used in the liquid ejection apparatus used in the ink jet recording apparatus or the like, the ink supply port is opened as a through-hole penetrating through the substrate, and the substrate is not smooth. For this reason, in the case of laminating a thin film made of a resist material on the substrate, it is impossible to directly apply the resist material onto the substrate. Therefore, a resist film is formed on the substrate by transferring a dry film to the substrate. A dry film in which the resist material is applied in advance on a base film, for example, by a spin coating method is manufactured. Then, the manufactured dry film is transferred to the substrate by vacuum lamination. Then, a desired pattern is formed on the substrate by performing an exposure step and a development step on the substrate to which the dry film is transferred.

<Manufacturing Method of Liquid Ejection Head>

FIG. 3 is a flow chart illustrating a manufacturing method of the liquid ejection head according to the present exemplary embodiment. FIGS. 4A to 4F illustrate a frame jig 41 according to the present exemplary embodiment, a manufacturing step and a transfer method of the drying film using the frame jig 41. Hereinafter, the present invention is described with reference to FIGS. 3 and 4A to 4F.

<Frame Jig>

First, the frame jig 41 (support) used in the present exemplary embodiment is described. The frame jig 41 is fixed to the base film. Further, as described below, the dry film is manufactured in a state in which the base film is fixed to the frame jig 41, and the manufactured dry film is transferred to the substrate in a state in which the dry film is fixed to the frame jig 41. Although described below in detail, the resist material (resist layer) on the dry film faces the substrate in the case of transferring the dry film to the substrate. Then, after the dry film (resist layer) is attached to the substrate, a base film portion is delaminated, thereby forming the resist layer on the substrate.

In the frame jig 41 according to the present exemplary embodiment, a rigidity at a side thereof extending in an attachment direction (first direction) in which the dry film (resist layer) is attached to the substrate and a rigidity at a side extending in a delamination direction (second direction) in which the dry film (base film portion) is delaminated from the substrate are different from each other. More specifically, the side extended in the attachment direction in which the film is attached to the substrate has a higher rigidity. In the frame jig 41 in FIG. 4A, among sides constituting a peripheral edge of a frame, a pair of opposing sides thereof are composed of high-rigidity portions 42 having a relatively high rigidity and another pair of opposing sides thereof are composed of low-rigidity portions 43 having a relatively low rigidity. The delamination direction (second direction) is a direction intersecting with the attachment direction (first direction).

Figure 1B:
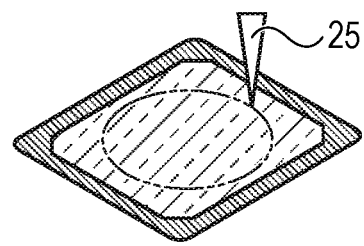
Figure 1C:
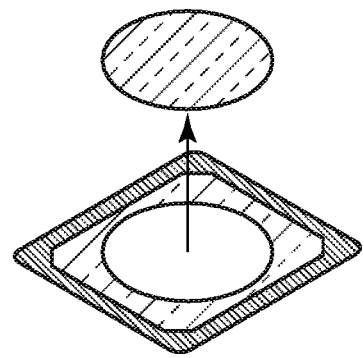
Figure 1D:
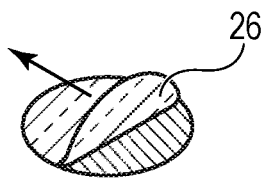
Figure 1E:
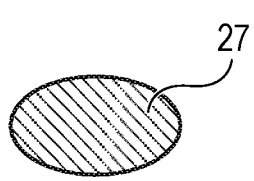

The reason why to use this frame jig 41 is described. In the case of delaminating a film from a substrate in a state in which the film is not fixed to a frame, a method of delaminating film while supporting an end portion of the film and bending the film can be considered. However, in the frame fixing the film, rigidity is required in order to constantly maintain tension of the film at the time of transferring the film (resist material) to the substrate. For this reason, in the case of delaminating the film from the substrate after transferring the resist material of the film fixed to the frame to the substrate, it is difficult to bend the film due to rigidity of the frame fixing the film. Therefore, according to the related art, as illustrated in FIGS. 1B and 1C, a dry film 22 is separated from an outer peripheral portion of a substrate using a cutter 25, and a base film 26 is delaminated in a state in which the film is bent.

On the contrary, in the frame jig 41 according to the present exemplary embodiment, the pair of sides are composed of the high-rigidity portions 42 having a relatively high rigidity and another pair of sides are composed of the low-rigidity portions 43 having a relative low rigidity. According to the configuration as described above, at the time of attaching the resist material of the film fixed to the frame jig 41 to the substrate, it is possible to form the resist material on the substrate while constantly maintaining tension of the film by attaching the resist material along the high-rigidity portions 42. Further, in the case of delaminating the film from the substrate, it is possible to bend the frame jig 41 itself along the low-rigidity portions 43. That is, since the film itself is bent in a state in which the film is fixed to the frame jig 41, the dry film (base film portion) can be delaminated from the substrate without using the cutter 25. That is, the frame jig 41 according to the present invention has the pair of sides having a high rigidity and the pair of sides having a low rigidity, such that the frame jig satisfies conflicting requirements required in the frame. Further, in the present exemplary embodiment, a jig having a tetragonal frame shape is used, but the frame jig is not limited thereto. The jig may have any shape as long as the jig can have a high-rigidity portion having a relatively high rigidity and a low-rigidity portion having a relative low rigidity and constantly maintain tension of the film.

<Manufacturing Steps>

S300 in FIG. 3 is a manufacturing step (production step) of the dry film for forming a resist film using a spin coating method. S300 can be sub-divided into steps of S305 to S325. First, the above-mentioned frame jig 41 (support) is prepared.

Figure 4A:
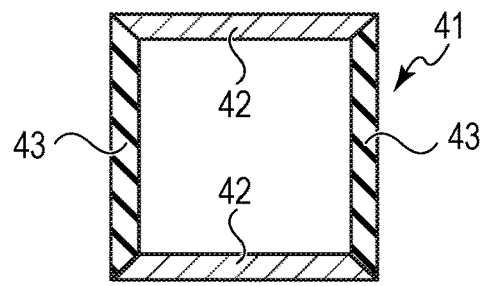
FIGS. 4A, 4B, 4C, 4D, 4E and 4F are views for explaining a transfer method according to the present exemplary embodiment.
Figure 4B:
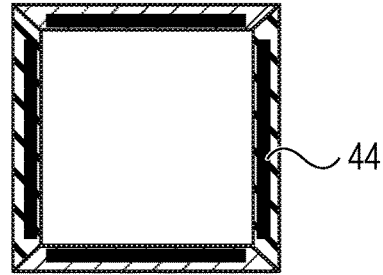
Figure 4C:
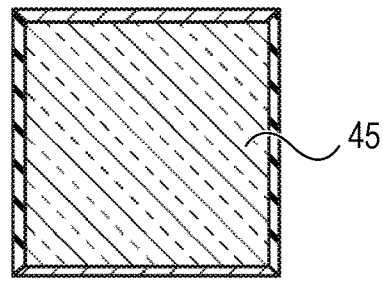

In S305, a base film 45 is fixed to the prepared frame jig 41. In consideration of application accuracy of the resist material or an influence at the time of subsequently transferring the base film to the substrate, the base film 45 is fixed so as to suppress twists or wrinkles as much as possible. According to the present exemplary embodiment, as illustrated in FIG. 4B, a film fixation tape 9 is attached to the frame jig 41. In addition, as illustrated in FIG. 4C, the base film 45 is attached thereto. Therefore, the base film 45 is fixed to the frame jig 41. Further, the base film may also be attached thereto using an adhesive as well as a double-sided tape as described above. In addition, although the film fixation tape 9 is attached to four sides of the frame jig 41 in the present exemplary embodiment, but is not limited thereto. For example, the film fixation tape 9 may also be attached to only two sides. The frame jig 41 fixing the base film 45 is fixed to a rotation chuck (not illustrated).

Figure 4D:
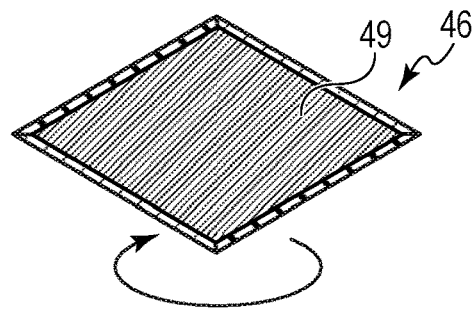

In S310, the resist material, which is a material for manufacturing the liquid ejection head, is dropped onto a surface of the base film 45 fixed to the frame jig 41. Further, in S320, as illustrated in FIG. 4D, the resist material is applied onto the surface of the base film 45 by the spin coating method, thereby forming the resist film (resist layer 49) on the base film 45. That is, the resist material dropped onto the surface of the base film 45 spreads by centrifugal force by rotating the frame jig 41 at a high speed, such that the resist layer 49 is formed on the base film 45. As the resist material, for example, a photosensitive resin (epoxy resin) is used.

In S320, side rinse is performed using a coater, etc. (not illustrated) having side rinse mechanism. Here, the term "side rinse" means a step of removing the resist material in a region (that is, a region that is not used as the liquid ejection head) outside an effective region by applying a solvent having solubility to the resist material in the region outside the effective region while rotating the frame jig 41.

In S325, the dry film 46 is completed by performing baking. The baking is a step of heating a film applied with a resist to remove a solvent in the resist and uniformly disperse and stabilize the material in the resist.

Figure 4E:
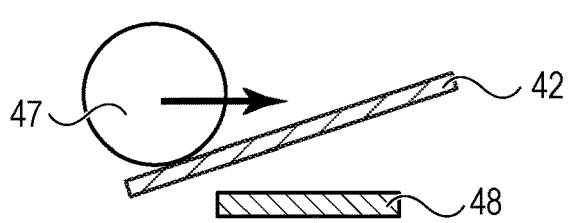
Figure 4F:
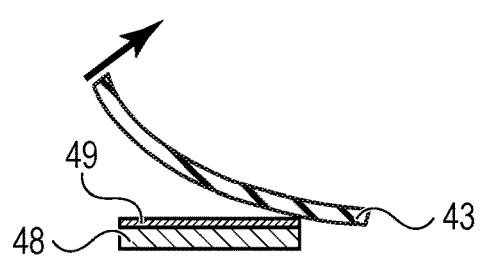

Thereafter, the manufactured dry film 46 is transferred to the substrate 48. That is, in S330, the resist layer 49 on the dry film 46 is attached to the substrate 48. Here, as illustrated in FIG. 4E, the transfer is performed so that a direction in which the dry film 46 (resist layer 49) is attached to the substrate 48 by a pressure roller 47 coincides with a direction (first direction) along the high-rigidity portion 42. That is, at the time of attaching the dry film 46, a scanning direction of the pressure roller is allowed to coincide with a direction along the high-rigidity portion 42 of the frame jig 41. The direction (the first direction) along the high-rigidity portion 42 can be referred to as an extension direction of the high-rigidity portion 42. As described above, the dry film 46 is attached to the substrate 48 in a state in which tension of the dry film 46 is constantly maintained. Thereafter, in S335, as illustrated in FIG. 4F, the frame jig 41 is bent in a direction (second direction) along the low-rigidity portion 43, such that the base film 45 is delaminated. That is, at the time of delaminating the base film 45, a delamination direction is allowed to coincide with the low-rigidity portion 43 of the frame jig 41. Therefore, the base film 45 can be delaminated without separating the film using a cutter or the like. As described above, the resist layer 49 is formed on the substrate 48.

As described above, in the present exemplary embodiment, when the dry film 46 is transferred, at the time of attaching the dry film 46, an attachment direction, that is, the scanning direction of the pressure roller is allowed to coincide with the high-rigidity portion 42 of the frame jig 41. At the time of delaminating the base film 45, the delamination direction is allowed to coincide with the low-rigidity portion 43 of the frame jig 41. According to the transfer method as described above, at the time of attachment, tension is applied to the dry film 46 at a predetermined level or more, and at the time of delamination, tension to the base film 45 can be suppressed to a predetermined level or less.

In S340, a pattern is formed on the substrate through steps such as a pattern exposure step, a post exposure bake (PEB) step and a development step using the transferred resist film. By repeating these steps as necessary, the recording element substrate 6 is formed, such that the liquid ejection head is manufactured.

Further, although a case in which as a method for applying the resist onto the dry film, the spin coating method is used is described by way of example in the present exemplary embodiment, but the coating method is not limited thereto. Various coating methods such as a slit nozzle method, a slit die method and a gravure roll method may also be used. Further, although a case in which the resist layer is formed on the film by the resist member is described, but the present invention is not limited thereto. Another member may also be formed on the film to thereby be transferred. Further, although a case in which an object to which the film is transferred is the substrate is described, any object may be used.

Further, although a case in which as an example of the frame jig, the frame jig having a tetragonal frame shape is described by way of example in the present exemplary embodiment, the frame jig is not limited thereto. A jig having any shape can be used as long as a rigidity of the jig in the first direction and a rigidity of the jig in the second direction are different from each other. For example, in a frame portion of the frame jig, a support rod extending in the first direction (attachment direction) and having rigidity similar to that of the high-rigidity portion 42 may be provided. Further, the support rod may be provided in plural. In addition, a jig having an interdigital shape in which these support rods are arranged in the second direction (delamination direction) at a predetermined interval and the support rods are connected with each other by a strip or the like.

As described above, according to the present exemplary embodiment, the pair of sides of the frame jig 41 are composed of the high-rigidity portions and another pair of sides thereof are composed of the low-rigidity portions so as to satisfy the conflicting requirements required in the frame jig 41. Further, the dry film is transferred to the substrate using the frame jig 41 as described above. For this reason, the dry film can be transferred to the substrate without performing separation which causes generation of dust.

EXAMPLE

Example 1

Hereinafter, Example 1 is described. As illustrated in FIG. 4A, a frame jig 41 was composed of a pair of high-rigidity portions 42 and a pair of low-rigidity portions 43, wherein the high-rigidity portions 42 were made of stainless steel and the low-rigidity portions 43 were made of a rubber material. An external size of the frame jig 41 was 320 mm×290 mm, an internal size was 270 mm×240 mm, and a thickness thereof was 1.2 mm. A surface roughness thereof was 3 μm or less and flatness thereof was 0.2 mm or less.

As illustrated in FIG. 4B, a film fixation tape 9 was attached to the frame jig 41. As the film fixation tape 9, a heat-foaming type double-sided tape having a length of 250 mm and a width of 10 mm was used so that at the time of delaminating a film (base film 45) from the frame jig 41 after the transfer was completed, the film could be easily delaminated by heating the tape using a heater.

Next, as illustrated in FIG. 4C, the base film 45 was attached to the frame jig 41. At the time of attachment, the base film 45 was attached in a state in which tension was applied to the base film 45 at a predetermined level or more using a dedicated device so that wrinkle or warpage was not generated. The base film 45 was made of a PET material and having a thickness of 100 μm and a width of 254 mm was cut at a length of 300 mm to thereby be used.

Next, as illustrated in FIG. 4D, a resist was formed in a layer shape on the base film 45, thereby forming a dry film 46. At the time of formation, the resist was formed by a spin coating method using a dedicated device and baked, thereby forming the dry film using the resist. Specifically, a surface of the frame jig 41 to which the base film 45 was attached was disposed to face upward, and the resist was applied thereto using a dedicated spin coater (manufactured by Tokyo Ohka Kogyo Co. Ltd., trade name: "SUS frame-compatible coater"). Film thickness distribution was set to 3% or less by ejecting 10 cc of resist and rotating the frame jig 41 at 1500 rpm.

Next, as illustrated in FIG. 4E, the dry film 46 was attached to a substrate 48. At the time of attachment, the high-rigidity portion 42 of the frame jig 41 and an attachment direction were allowed to coincide with each other using a dedicated device, such that the dry film was attached in a direction along an extension direction of the high-rigidity portion 42. Specifically, a surface of the dry film 46 on which the resist layer was formed was disposed to face downward, and the dry film 46 was attached to the substrate 48 by using a vacuum adhesion apparatus (manufactured by Takatori Corp., trade name: "VTM-200F"). A temperature of a table holding the substrate 48 under a vacuum of 100 Pa was set to 60° C., a pressure of a pressure roller 47 incorporated in the apparatus was set to 0.4 MPa, and a scanning speed was set to 1 mm/s. Here, the high-rigidity portion 42 of the frame jig 41 and a scanning direction of the pressure roller 47 coincided with each other.

Finally, as illustrated in FIG. 4F, the base film 45 was delaminated together with the frame jig 41 from the substrate 48. At the time of delamination, the low-rigidity portion 43 of the frame jig 41 and a delamination direction were allowed to coincide with each other using a dedicated device, and a delamination speed was 1 mm/s.

The dry film was transferred so that only the resist layer 49 remained on the substrate 48 by the above-mentioned method. As a result of confirming a thickness of the resist layer after transfer, an average thickness was 15.0 μm, and film thickness distribution was 2.5%.

Example 2

Hereinafter, Example 2 is described. A frame jig in Example 2 was manufactured so that a high-rigidity portion and a low-rigidity portion were made of the same material but had different widths from each other. An external size thereof was 320 mm×290 mm and a thickness thereof was 1.2 mm. A width of a frame was 25 mm at the high-rigidity portion and 10 mm at the low-rigidity portion. Transferring to the substrate was performed using this frame jig. The transfer method was similar to that in Example 1.

A dry film was transferred so that only a resist remained on a substrate by the above-mentioned method. As a result of confirming a thickness of a resist layer after transfer, an average thickness was 15.0 μm, and film thickness distribution was 2.5%.

Example 3

Hereinafter, Example 3 is described. A frame jig in Example 3 was manufactured so that a high-rigidity portion and a low-rigidity portion were made of the same material but had different thicknesses from each other. An external size thereof was 320 mm×290 mm and an internal size thereof was 270 mm×240 mm. A thickness of the high-rigidity portion was set to 1.2 mm and a thickness of the low-rigidity portion was set to 0.5 mm. Transferring to the substrate was performed using this frame jig. The transfer method was similar to that in Example 1.

A dry film was transferred so that only a resist remained on a substrate by the above-mentioned method. As a result of confirming a thickness of a resist layer after transfer, an average thickness was 15.0 μm, and film thickness distribution was 2.5%.

In Examples 1 to 3, the description has been made assuming that any one of the materials, widths and thicknesses of the frame jig in the delamination direction and the attachment direction were different from each other, but the present invention is not limited thereto. At least one of the materials, widths and thicknesses may be different from each other. For example, the material of the frame jig in the delamination direction and the attachment direction may be the same each other, and the widths and the thicknesses thereof may be different from each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-150004, filed Aug. 2, 2017, which is hereby incorporated by reference herein in its entirety.

What is claimed is:

1. A transfer method for transferring a member provided on a film to an object using a frame jig holding the film, the transfer method comprising:
   attaching the member provided on the film to the object in a first direction; and
   delaminating the film from the object in a second direction, which intersects the first direction,
   wherein the frame jig has a pair of first frame edges and a pair of second frame edges,
   wherein the pair of first frame edges are opposed to each other and extend in the first direction,
   wherein the pair of second frame edges are opposed to each other and extend in the second direction, and
   wherein the pair of first frame edges are rigid.

2. The transfer method according to claim 1, wherein at least one of materials, widths, and thicknesses of sides of the frame jig in the first and second directions are different between the pair of first frame edges and the pair of second frame edges.

3. The transfer method according to claim 1, wherein the first direction is a direction along a scanning direction of a pressure roller used in the attaching.

4. The transfer method according to claim 1, wherein the member is a resist material, and the object is a substrate in which a through-hole is formed.

5. The transfer method according to claim 1, wherein a tension of the film is maintained constantly during the attaching.

6. The transfer method according to claim 1, wherein the pair of second frame edges bend during the delaminating.

7. The transfer method according to claim 1, wherein the film is attached to frame jig along one of the pair of first frame edges and the pair of second frame edges.

8. The transfer method according to claim 1, wherein the film is attached to frame jig along both the pair of first frame edges and the pair of second frame edges.

9. A manufacturing method of a liquid ejection head including a substrate having an energy-generating element for ejecting a liquid and a through-hole for supplying the liquid, and an ejection orifice through which the liquid is ejected, the ejection orifice being provided at a position facing a surface of the substrate on which the energy-generating element is provided, the manufacturing method of the liquid ejection head comprising:
    forming a resist layer for forming the ejection orifice on a film held on a frame jig;
    attaching the resist layer formed on the film to the substrate in which the through-hole is formed in a first direction;
    detaching the film from the substrate in a second direction intersecting the first direction; and
    forming the ejection orifice using the resist layer attached to the substrate,
    wherein the frame jig is rigid in the first direction.

10. The manufacturing method of the liquid ejection head according to claim 9, wherein the frame jig has a tetragonal frame shape,
    wherein a pair of first opposing sides of the frame jig are rigid and extend in the first direction, and
    wherein the second direction is a direction in which a pair of second opposing sides of the frame jig extend.

11. The manufacturing method of the liquid ejection head according to claim 10, wherein at least one of materials, widths, and thicknesses of sides of the frame jig in the first and second directions are different between the pairs of first and second opposing sides.

12. The manufacturing method of the liquid ejection head according to claim 9, wherein the first direction is a direction along a scanning direction of a pressure roller used in the attaching.

* * * * *